United States Patent
Teng et al.

[11] Patent Number: 5,930,473
[45] Date of Patent: *Jul. 27, 1999

[54] VIDEO APPLICATION SERVER FOR MEDIATING LIVE VIDEO SERVICES

[76] Inventors: Peter Teng, 739 Christine Dr., Palo Alto; Bruce Albert Thompson, 3361 Americus Dr., San Jose; Fouad A. Tobagi, 1183 Laureless Dr., Los Altos; Joseph M. Gang, Jr., 13760 Lexington Ct., Saratoga, all of Calif. 95070

[*] Notice: This patent is subject to a terminal disclaimer.

[21] Appl. No.: 08/612,744

[22] Filed: Mar. 8, 1996

Related U.S. Application Data

[63] Continuation-in-part of application No. 08/082,227, Jun. 24, 1993, Pat. No. 5,550,982.

[51] Int. Cl.[6] .................................................. H04L 12/18
[52] U.S. Cl. ................................ 395/200.34; 395/200.49; 395/684
[58] Field of Search ........................ 395/200.01, 200.04, 395/330, 200.12, 200.3, 200.34, 200.57, 200.49, 684; 348/15, 17, 19; 345/330

[56] References Cited

U.S. PATENT DOCUMENTS

| | | | |
|---|---|---|---|
| 4,882,743 | 11/1989 | Mahmound | 348/15 |
| 5,257,306 | 10/1993 | Watanabe | 348/15 |
| 5,410,343 | 4/1995 | Coddington et al. | 348/12 |
| 5,550,982 | 8/1996 | Long et al. | 395/200.49 |
| 5,608,653 | 3/1997 | Palmer et al. | 348/12 |

*Primary Examiner*—Richard L. Ellis
*Assistant Examiner*—Patrice L. Winder
*Attorney, Agent, or Firm*—Proskauer Rose LLP

[57] ABSTRACT

An apparatus and method for use in a network including source clients and viewer clients connected to one or more shared transmission media. A video server is connected to one of the transmission media and is operative to control the broadcast and storage of multiple live or previously-stored video streams. The control may be provided via remote procedure call (RPC) commands transmitted between the server and the clients. In one embodiment, a video presentation system is provided in which a video stream from a source client is continuously broadcast to a number of viewer clients. One or more of the viewer clients may be authorized by the source client to broadcast an audio and/or video stream to the other clients receiving the source video stream. In another embodiment, a multicast directory is provided to each of a plurality of viewer clients by transmitting directory information in a packet corresponding to a predetermined multicast address. The multicast directory indicates to a particular viewer client which of a number of video programs are available for broadcast to that client.

23 Claims, 5 Drawing Sheets

VIDEO APPLICATION SERVER FOR MEDIATING LIVE VIDEO SERVICES

RELATED APPLICATIONS

The present application is a continuation-in-part of copending U.S. patent application Ser. No. 08/082,227 entitled VIDEO APPLICATION SERVER filed on Jun. 24, 1993 now U.S. Pat. No. 5,550,982. Other related and commonly-assigned U.S. patent applications include Ser. No. 07/977,493 entitled METHOD OF OPERATING A DISK STORAGE SYSTEM by Fouad A. Tobagi et al now U.S. Pat. No. 5,581,784 and Ser. No. 08/254,576 entitled METHOD FOR INTERFACING A VIDEO STORAGE SYSTEM WITH A VIDEO APPLICATION SERVER by Randall B. Baird et al now U.S. Pat. No. 5,822,394. The disclosures of these related applications are incorporated herein by reference.

FIELD OF THE INVENTION

The present invention relates to controlling distribution of digital full motion video over communication networks. More particularly, the present invention relates to a video server for controlling distribution of live full motion video streams between clients attached to one or more communication networks, and for integrating live full motion video distribution with other functions such as recording and playback of video streams.

BACKGROUND OF THE INVENTION

The demand for networked digital audiovisual systems is expected to grow considerably over the next few years, as businesses, government and other institutions increasingly turn to digital networks to distribute live and/or pre-recorded audiovisual information for education, presentations and reference applications. These customers expect systems that will allow a number of people to be able to view audiovisual information simultaneously, while fully retaining their other network functions. For example, in business computing, most of the major productivity software developers see networked live or stored video as an effective means of training and supporting users. Many of these developers have begun including VHS videotapes for training with their software. Now they want to take this a step further by linking live or stored video directly to their software's on-line help resources. Centralizing that support reduces the cost for customers with many users and ensures that it is properly maintained by the MIS department or other responsible.

Networked video presentation systems in business can allow corporate resources, such as sales videos, employee information, and live video-based training to be available immediately to all employees from their desks. Similarly, networked video documentation systems will allow institutions of all kinds to maintain multi-user audiovisual databases. The largest population of users of such systems are likely to be health care institutions which have extensive audiovisual records. Such databases can be used for on-the-job reference such as revisiting a complex procedure on the manufacturing floor, or creating on-line archives of TV commercials for an advertising agency.

Video teleconferencing is a fast growing segment in the communications arena. However, most of today's live video teleconferencing installations are dedicated, standalone facilities set aside for that purpose. While the price tag for such systems is dropping, it remains an expensive facility that needs to be shared. Extending these services to the desktop over local area networks will make live video teleconferencing services more widely available at a lower cost.

Finally, the ultimate goal is computer-supported collaboration, whereby users at different locations will be able to share stored and live video data and work on problems simultaneously using multimedia workstations linked by local and wide-area networks. Users of such desktop conferencing systems will be able to access stored video and audio from a central server, hold live audio/video conferences with remotely based colleagues via the PCs on their desks and work simultaneously with them on files in a shared electronic workspace.

These examples clearly show that the support of digital video services preferably includes the communication of live full motion video information over digital networks.

The characteristics of files, file access and network traffic in digital video applications differ substantially from those encountered in data applications.

With data applications, whenever a user makes a file access request to a server, or requests that data be transmitted on a network, the user expects a fast response time relative to the time it takes it to place the next request. As a result, the capacity of a server and the overall network bandwidth must both be large compared to the average demand placed by a single user. Accordingly, the design of a file server aimed at supporting data applications and the design of a network to support data traffic have been based on the principle of bandwidth sharing and statistical time multiplexing. For example, local area networks of the Ethernet type (10 Mbits/s) and of the token-ring type (4 and 16 Mbits/s) serving tens to hundreds of users have proliferated. File servers have furthermore taken advantage of the property of locality in file access, and incorporated appropriate caching mechanisms. In all cases, as the overall load placed on the shared resources increased, the average response time experienced by all users also increased.

Let us examine now digital video. A video signal is analog in nature and continuous over time. It is digitized by first sampling it at regular intervals, and then by quantizing each sample. This digitization process results in a data stream which is of relatively constant and very high rate; (NTSC signals result in data rates in the neighborhood of 100 Mb/s, and an HDTV signal, 600 Mb/s.) However, given that the sampled data exhibits a great deal of redundancy, compression is applied, thus significantly reducing the stream's rate. Depending on the bandwidth of the original analog signal, the sampling rate, the quantization step size, the encoding method, and the desired image quality, the resulting data rate for a digital video signal can range from 64 Kb/s to tens of Mb/s. For example, CCITT Recommendation H.261 specifies video coding and decoding methods for audio visual services at the rate of px64 Kbits/s, where p is in the range of 1 to 30 (i.e., 64 Kb/s to 2 Mb/s); the MPEG standard specifies a coded representation that can be used for compressing video sequences to bit rates around 1.5 Mbits/s, and its successor, known as MPEG II, provides a wider range of functionality and image quality at rates in the range of 4 to 8 Mbits/s. Advances in compression techniques and in their VLSI circuit implementations are among the important reasons why video services over LANs are becoming practical.

Two important observations may be made. The first is that the volume of bits corresponding to a digitized video segment of useful duration (even compressed) is large. A ten minute DVI video segment requires 90 Mbytes of storage;

ten hours require over 5 Gbytes. Thus video servers where shared video information is to be stored must have relatively large storage capacity.

The second observation is that the communication of digital video data between two nodes on a network (e.g., a stored video stream transmitted between a server and a desktop station, or a live video stream transmitted between two desktop stations) requires that data be transmitted in a stream fashion. This means that data packets must be delivered to the destination on time, and failure to deliver data on time would result in video quality degradation. (This characteristic has earned this type of traffic the attribute synchronous or isochronous.) This has two main implications: (i) from a network's point of view, one requires the availability, on a continuous basis, of a bandwidth at least equal to the signal's data rate; (note that the data rate associated with a digitized video signal, even compressed, is larger than the average traffic rate for a typical data application user;) (ii) from a file and storage system point of view, one requires streaming capabilities which guarantee the continuity of each stream being retrieved or stored. Thus, in order to support multiple independent video signals, the network must have the necessary aggregate bandwidth as well as means to guarantee the bandwidth required for each video signal, and the file and storage system must be of the streaming type and must have a capacity sufficient to handle all video streams. By the same token, there is a maximum number of video streams of a given data rate that a network and a server can support, and means must exist to prevent additional requests from overloading the system. While in data applications an overload results in higher response time, with live video applications, any additional load beyond the maximum possible would result in degraded video quality.

It is thus clear that the characteristics of video traffic differ substantially from those of traditional data traffic to the point that servers and local area networks designed primarily to support data applications are not appropriate to effectively support video services. New capabilities in servers and networks must be offered.

Accordingly, it is an object of the present invention to provide a video server suitable for supporting a wide variety of live full motion video applications as well as integrating live video distribution with other functions including video recording and playback.

SUMMARY OF THE INVENTION

The present invention provides for server-mediated broadcast, multicast and unicast of multiple simultaneous live or previously-stored full motion video streams in a network. The invention may be utilized in a communication network in which source clients and viewer clients are connected to one or more network segments of a local area or wide area network. A video server connected to one of the network segments controls the transmission of a live video stream from one of the source clients connected to a given network segment to one or more viewer clients connected to the same or another network segment. The number of viewer clients for a particular video stream depends on whether the transmission is a broadcast, multicast or unicast. The server thus mediates transmission of video streams within a given network segment or across different network segments. The network segments may be local or wide area network segments interconnected by hub switches, public switched telephone networks, or satellite networks.

A video server configured in accordance with the invention also directs storage of live video to mass digital storage devices such as a disk array directly connected to the server, attached to the same network segment as the server, or attached to other network segments. This permits, for example, a live video teleconference to be recorded for later playback. The server can also provide playback of previously-stored video from CD-ROMs or other storage devices in conjunction with or in place of live video multicasting. Control of broadcast, multicast, unicast and storage functions may be provided in accordance with remote procedure call (RPC) commands transmitted between the server and the clients.

One aspect of the invention involves a video presentation system in which a video stream from a designated source client is continuously broadcast over a network to a number of viewer clients. One or more of the viewer clients may be authorized by the source client to broadcast an audio and/or video stream to the other clients receiving the source video stream. A viewer client which desires to broadcast a stream over the network to the presenter and/or other viewer clients can send an authorization request to a video server connected to the network using the server RPC features. The server conveys the request to the source client, who may enter an authorization command in response. The server processes the authorization command such that the authorized viewer client is permitted to broadcast, for example, an audio stream over the network. The source client can terminate the authorization and resume transmission of its own audio stream by sending an appropriate command to the server.

Another aspect of the invention is directed to a multicast directory service which may be provided to each of a plurality of viewer clients by a video server. The multicast directory indicates to a particular viewer client which of a number of video programs are available for transmission to that client. The directory may also be used to provide broadcast and unicast information. In one embodiment, the directory is provided by the server reserving a predetermined multicast address for periodic transmission of directory information to viewer clients. The directory information may be transmitted in a packet or packets corresponding to the multicast address and may include addresses or other identifiers for all of the video programs available to a particular viewer. A single predetermined multicast address can thus be used to convey address information for all other currently-available live video programs. A given viewer client receives the directory information by "tuning" to the multicast address in a conventional manner, and utilizing the information to compile a directory list. Alternatively, the directory information may be transmitted in packet form from one or more of the source clients. In either case, the transmission of directory information may be mediated by the video server via remote procedure calls or other client-server information transfer mechanisms. Such a multicast directory service is particularly useful in the case where a viewer client has no upstream communication capability and can only receive information from the server or another client but cannot transmit to the server or client. An example of this case is a receive-only viewer client which receives video via a satellite downlink.

DETAILED DESCRIPTION OF THE INVENTION

The present invention will be described in several sections below. Section I describes server mediation of live and stored video distribution functions in a multiple-segment communication network in accordance with an exemplary embodiment of the invention. Section II describes exemplary video server hardware and software configurations. Section III describes exemplary client hardware and software configurations. Section IV describes a specific server-mediated live video broadcast application which includes audio return channels from multiple viewer clients. Section V describes multicast directory service features of the present invention.

I. Server Mediation of Live and Stored Video Services

The present invention provides server-mediated integrated distribution of both live and stored video in numerous applications. The term "video" as used herein should be understood to include combined audio/video streams configured in accordance with standards such as H. 261, MPEG and MPEG II as well as streams which include video in combination with other types of data.

Figure 1:
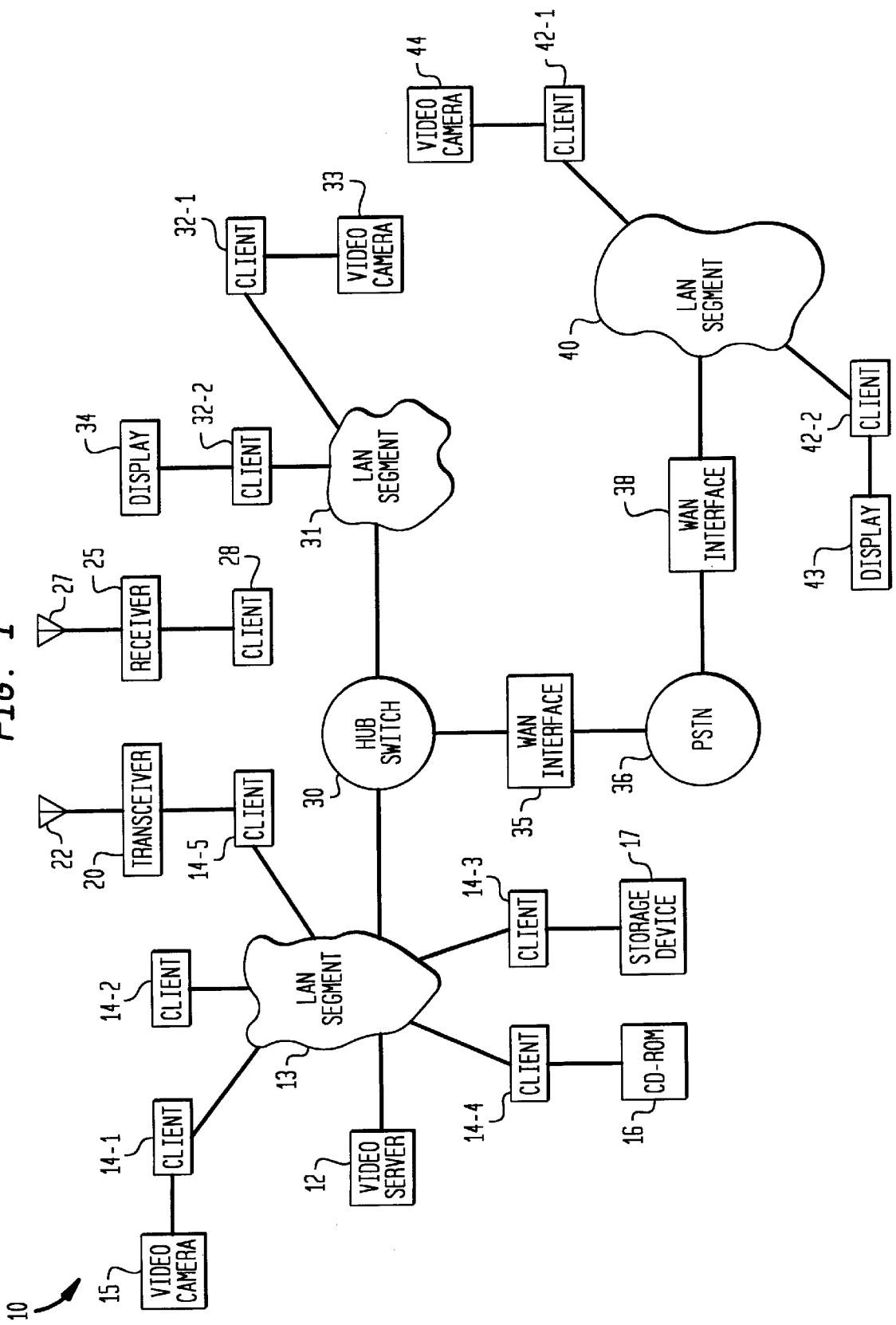
FIG. 1 illustrates video server mediation of live and stored video distribution functions in a multiple-segment communication network in accordance with an exemplary embodiment of the present invention.

FIG. 1 shows an exemplary communication network 10 in which a video server 12 is connected to a local area network (LAN) segment 13. The server 12 communicates with other LAN segments 31, 40 of network 10 via a hub switch 30. The server 12 mediates broadcast, multicast and unicast of live and stored full motion video over the various LAN segments 13, 31 and 40 in accordance with the invention. As used herein, the term "broadcast" refers generally to a transmission from one source client to all possible destination clients, the term "multicast" refers to a transmission from one source client to a subset of all possible destination clients, and the term "unicast" refers to a transmission from one source client to one destination client. The live full motion video may be provided by video cameras or other video sources connected to one or more clients. The server 12 can record and playback full motion video by accessing suitable storage devices. The server 12 may also mediate video transmission via satellite using suitable arranged transceivers. It should be noted that the network 10 may also be utilized for general data transmission applications. For example, one or more data file servers (not shown) may be connected to LAN segment 13 or integrated with the server 12 in a conventional manner.

The LAN segments 13, 31 and 40 may be, for example, Ethernet, token ring or asynchronous transfer mode (ATM) networks. A number of clients 14-$i$ and server 12 are connected to the LAN segment 13. The server 12 mediates flow of video streams between clients 14-$i$ using remote procedure call (RPC) commands and other server functions to be described in greater detail below. These functions include allocation of video signal bandwidth in LAN segment 13. The server 12 can mediate distribution of a live video stream supplied by a video camera 15 connected to client 14-1 to one or more of the remaining clients 14-$i$ as well as to other clients attached to other network segments. In certain embodiments of the invention, such as those in which desktop video conferencing is desired, each client may have its own video camera and desktop display.

Figure 2:
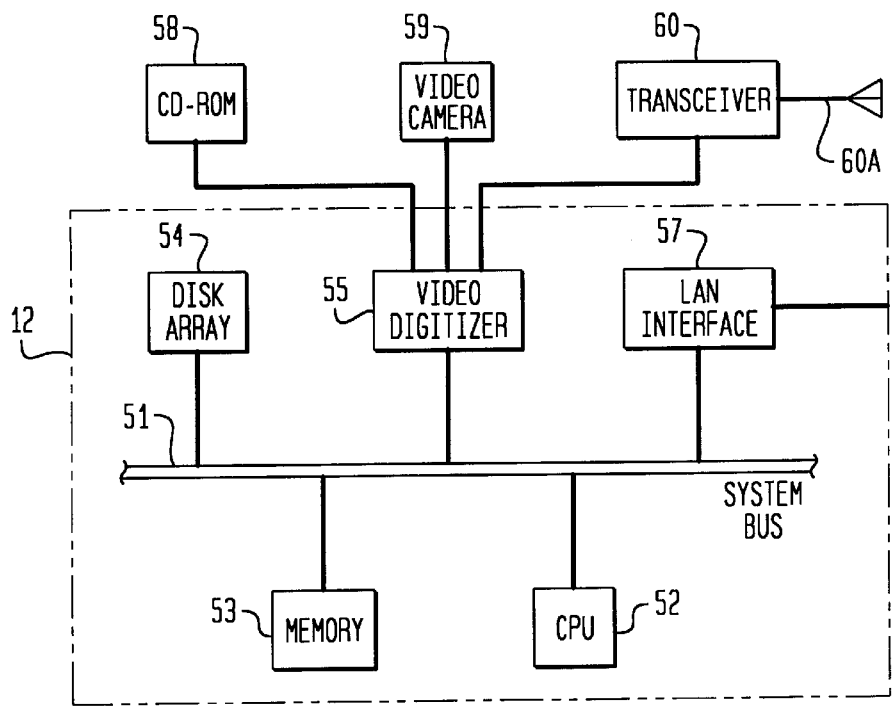
FIG. 2 schematically illustrates the hardware comprising the video server of FIG. 1.

The server 12 can also direct storage of video streams from one or more of the clients 14-$i$ and subsequently play the stored files back in accordance with video-on-demand selections of the clients. For example, a particular video program supplied by video camera 15 via client 14-1 may be stored at the direction of server 12 in a storage device 17 connected to client 14-3. The storage device 17 may be a magnetic disk array or tape, a recordable optical disk or an electronic memory. The server 12 may also direct storage of live or previously-recorded video to a mass digital storage device directly connected to the server itself. Such a mass digital storage device in the form of a disk array 54 is shown in FIG. 2 below. Additional details regarding video storage can be found in the above-cited U.S. patent applications Ser. Nos. 07/977,493 and 08/254,576.

A given stored video program may be played back in accordance with a request from one or more of the clients 14-$i$ connected to the LAN segment 13. The server 12 may retrieve stored video from a CD-ROM drive 16 via client 14-4 and then control the broadcast of the stored video to other clients. The server 12 can thus broadcast a stored video program in real time, thereby in effect treating a stored video source such as CD-ROM drive 16 as if it were a live video source like video camera 15. A particular live video program being viewed by a particular client 14-$i$ may be recorded by server 12 at the request of the client into a stored file in the server 12 or otherwise accessible by the server via LAN segment 13. Server 12 thus mediates numerous functions involving distribution of both live and stored video through LAN segment 13.

The server 12 also mediates distribution of live and previously-stored video to and from other networks and network segments in the exemplary communication network 10. The server 12 accesses a satellite network via a client 14-5 of the LAN segment 13 to which a transceiver 20 is connected. The transceiver 20 transmits signals to and receives signals from a satellite (not shown) via a two-way antenna 22. Clients of network 10 are thereby provided with the capability to transmit live or previously-stored video programs over the satellite network, and to access video programs available from the satellite network. The video programs broadcast from a particular client 14-$i$ or from the server 12 can thus be distributed through the satellite network via elements 14-5, 20 and 22. The live or previously-stored video broadcast may be received via an antenna 27 and a downlink receiver 25 by a client 28 which may represent a personal computer (PC) or a television monitor. The receiver 25 and client 28 may be part of a very small aperture terminal (VSAT) configured to communicate with the satellite network in a conventional manner.

The server 12 mediates distribution of live or stored video via a hub switch 30 to a second LAN segment 31. The hub switch 30 is also commonly referred to as a router. The LAN segment 31 is connected to clients 32-$i$ and these clients may receive and/or broadcast live and/or stored video under the control of video server 12. For example, a live video program from a video camera 33 attached to client 32-1 may be broadcast under the control of server 12 and viewed by client 32-2 on a display 34. The live video program from client 32-1 could also be broadcast by server 12 to one or more of the clients 14-$i$ connected to LAN segment 13, and may be stored at the direction of server 12 in the storage device 17 or in a mass digital storage device connected to the server itself.

The hub switch 30 also provides a connection via wide area network (WAN) interface 35 to a public switched telephone network (PSTN) 36. The PSTN 36 is connected via another WAN interface 38 to a third LAN segment 40. A number of clients 42-$i$ are connected to LAN segment 40. The server 12 can direct distribution of live or stored video to and from the clients 42-$i$ via PSTN 36 and hub switch 30. For example, a given client 42-2 may view on a display 43 a selected video program retrieved from CD-ROM drive 16 and broadcast from client 14-4 under the direction of video server 12. Client 42-2 may also direct server 12 to store the selected video program in storage device 17 connected to client 14-3. In addition, the server 12 may direct broadcast of a live video program supplied by a video camera 44 connected to client 42-1 to client 28 via the satellite network. The server 12 may be similarly utilized to mediate distribution of live and stored video in numerous other network configurations.

The network 10 may be utilized in a video conferencing application, with each of a number of the clients 14-$i$, 32-$i$ and 42-$i$ representing a desktop PC of a video conference participant. For example, clients 14-1, 32-1 and 42-1 could each provide a live video stream generated by video cameras 15, 33 and 44, respectively. The distribution of the streams among the clients 14-1, 32-1 and 42-1 is controlled by video server 12 in accordance with suitable commands entered by one or more of the users. The video cameras 15, 33 and 44 may be integrated with the desktop PC of the corresponding client. The video stream transmitted by one or more of the clients during the video conference may be stored at the direction of server 12 in a suitable storage device for later playback.

The network 10 may be utilized in live video multicasting applications in which M different live or previously-recorded video programs are available for distribution from M different source clients to N different viewer clients. The viewer clients in such an embodiment may represent television monitors equipped with set-top boxes suitable for sending commands to video server 12 to thereby control distribution of a selected video program.

The server 12 could also provide a directory list of stored or live video programs currently available to viewer clients. The viewer clients could request the list via an RPC command and then select one or more of the available video programs for viewing and/or storage. The server 12 would then respond by directing the appropriate video streams from one or more source clients or the server itself in accordance with the viewer client selections. A directory list could also be provided by transmitting directory information on a single predetermined multicast address. These and other exemplary directory services will be described in greater detail below.

As noted above, the server 12 may utilize bandwidth allocation and other access control functions in order to determine whether and when a particular client is permitted to broadcast a stored or live video stream via the various networks and network segments of network 10. The server 12 also controls the access of viewer clients to the broadcast video streams. For example, the server 12 could limit the number of viewer clients which are permitted to access a particular broadcast video stream. The limitation could be provided in accordance with a group number or privilege level assigned to a given viewer client, or via another suitable viewer limitation policy. The server 12 may also control whether a particular viewer client can record a video stream in the server memory or other suitable storage device.

Although the video server 12 is illustrated in FIG. 1 as a separate unit, it should be understood that the above-described server functions may instead be distributed across multiple server units and/or across other elements of the network 10, such as clients 14-$i$, 32-$i$ and/or 42-$i$. The term "video server" as used herein is therefore intended to include such a distributed server as well as a server implemented as a separate unit.

II. Video Server Description

FIG. 2 illustrates the major hardware components of the server 12. The server 12 comprises a system bus 51 which for example is an EISA bus. Connected to the system bus 51 are a CPU 52 and a local memory 53. The CPU is illustratively a 50 MHz 486 microprocessor, a Pentium chip or other CPU or a multiprocessor made up of a number of such CPU chips. The amount of local memory required by the video server depends on the number of users and may equal 16 Mbytes. The server 12 also includes an SCSI-II disk array 54 for multi-access digital video storage. A video interface 55 is provided for receiving externally generated (e.g., live) video and for digitizing this video. The video interface 55 also provides other functions such as A/D conversion, D/A conversion and format conversion to support transmission of video in the relevant transmission media. A LAN interface 57 interfaces the server 12 with the transmission medium of the LAN segment 13 of FIG. 1. Illustratively, the LAN interface 57 comprises multiple LAN cards (e.g., ethernet cards) to achieve the desired bandwidth. A number of video sources may be connected directly to the video interface 55. Suitable video sources include, for example, a CD-ROM 58 providing a number of user-selectable previously-recorded video programs, a video camera 59 for generating a live video program, and a transceiver 60 for receiving either live or previously-recorded video via an antenna 60A. The video server 12 may transmit live or stored video directly via the transceiver 60. The video server 12 can also access user-selectable video programs stored in disk array 54.

Figure 3A:
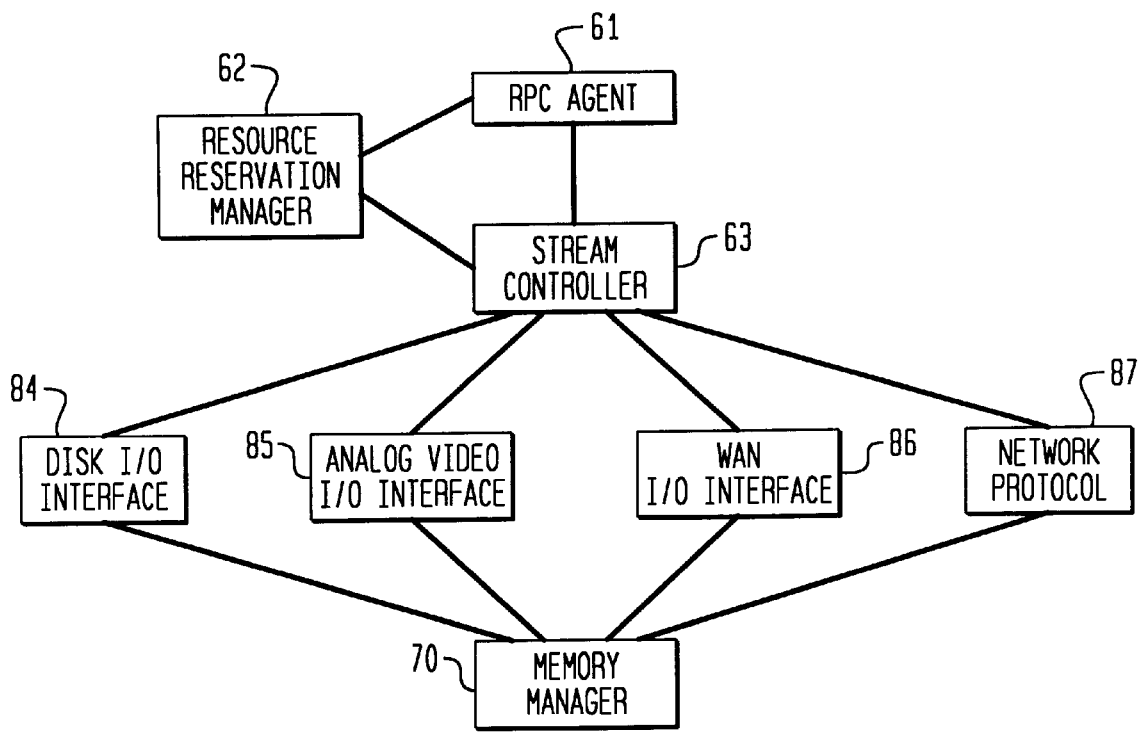
FIG. 3A schematically illustrates the software executed by the video server of FIG. 2.

A block diagram of the software executed in the server 12 is illustrated in FIG. 3A. The server software comprises three main control units: the RPC (Remote Procedure Call) Agent 61, the Resource Reservation Manager 62 and the Stream Controller 63. The RPC agent 61 is responsible for servicing Remote Procedure Calls received from clients. The received Remote Procedure Calls are decoded and translated into internal function calls for use in the server software. The Resource Reservation Manager 62 is responsible for admitting new streams into the network based on available resources as well as previously made reservations. System resources include CPU capacity, memory, disk I/O bandwidth and network bandwidth The stream controller 63 maintains the state of each stream and controls operations on each stream according to the current values of stream attributes. The stream controller 63 is also responsible for modifying the values of the stream attributes in response to Remote Procedure Calls received from a client. The stream attributes describe addressing, buffering, and connectivity characteristics of a stream. Stream attributes include: formats, identifications, source or destination, priority, maximum bandwidth, track statistics (e.g, size, number of disk array accesses, etc.)

Figure 3B:
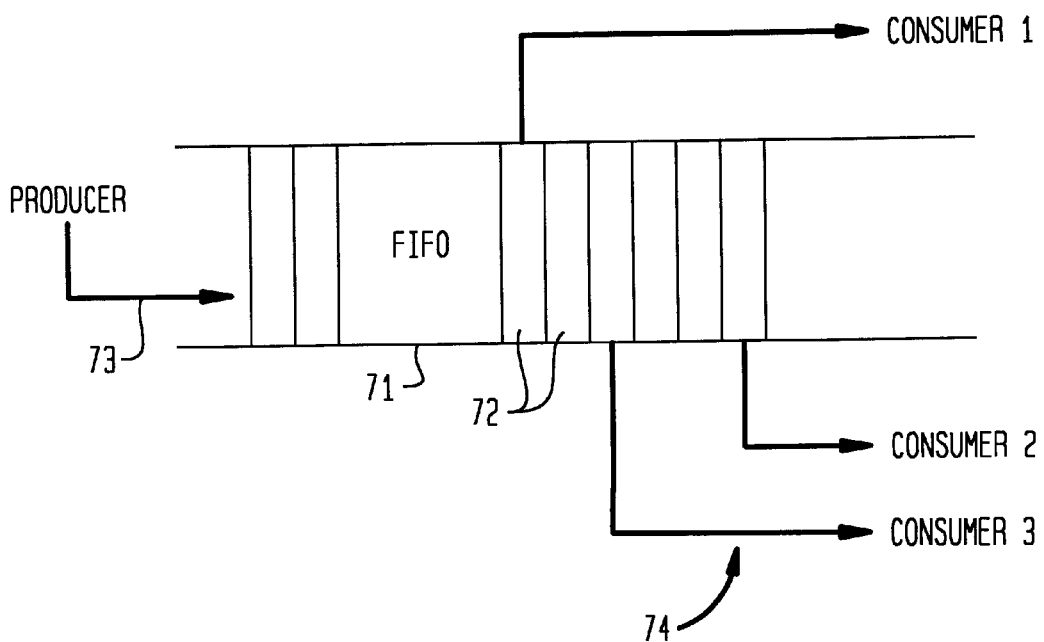
FIG. 3B schematically illustrates a memory manager comprising part of the software of FIG. 3A.

The dedicated video server software as shown in FIG. 3 also includes a memory manager 70 for controlling the local memory 53. The memory manager is shown in greater detail in FIG. 3B. The memory manager 70 provides efficient sharing of local memory 53 among multiple streams and minimizes memory copies of bulk data. The memory manager 70 makes use of one or more logical FIFO queues 71. One queue 71 is schematically illustrated in FIG. 3B. The queue 71 is a linked list of memory chunks 72. A producer 73 and one or more consumers 74 are associated with the queue 71. The producer 73 puts data into the queue and consumers 74 remove data from the queue. For example, the producer may be a disk I/O interface and a consumer may be a stream connection to a client. The production/consumption state of the queue is maintained by a number of producer/consumer pointers (not shown).

In the memory manager 70, the memory pool is partitioned into fixed sized chunks and multiple queues are allowed to allocate free memory chunks on a demand basis. The chunk size is optimized for stored video applications. It is also possible to allow the chunk sizes used by the producer and one or more consumers to be different. For example, the chunk size used for disk I/O transactions may be larger than the packet size used by a network consumer to transmit data over the network.

The software of the video server 12 as illustrated in FIG. 3A also comprises a number of I/O interfaces to adapt to different forms of video I/O. Thus interface 84 is for video stored in the disk array 54 and interface 85 is for analog video feed. The interface 85 is entirely conventional. The disk I/O interface 84 is discussed in detail in the above-cited U.S. patent applications Ser. Nos. 07/977,493 and 08/254,576.

In general, the disk I/O interface 84 operates as follows. The major design goal is to maximize the number of simultaneous streams while maintaining continuity requirements for each stream. For simplicity, consider the case where all streams are of fixed and equal rates, and that all I/Os are data retrievals from the disk array. A cyclic scheduling scheme may be utilized. In this scheme, time is divided into contiguous cycles of fixed length. Within a given cycle, a fixed amount of data is fetched from the disks in the disk array for each stream; the amount is determined by the product of the stream rate and the cycle length. Advantageously, this scheme satisfies the continuity requirement.

Under the cyclic scheduling scheme, the problem becomes that of maximizing the number of stream I/Os from the disk array within a cycle. The techniques of striping and sorting may be emphasized. Striping involves distributing the data being retrieved for each stream in a given cycle evenly across all disks in the disk array. This balances the load on all disks. Sorting involves ordering all the disk I/Os in a given cycle according to disk location among all streams. This minimizes the impact of long seek times.

The cycle length is another possible design parameter. A long cycle length can increase the number of simultaneous streams but it also increases the memory requirement since memory usage is linearly proportional to the cycle length. Furthermore, long cycle length also implies a long startup latency for new streams.

The server 12 of FIG. 3A also includes software 87 for executing a network protocol for the transmission of streaming (e.g., live video) data via the local area network. A protocol like the well-known Express Transport Protocol (XTP) can be used for this purpose.

As noted above, the exemplary video server features described in conjunction with FIGS. 2, 3A and 3B may be distributed across multiple server units and/or across one or more clients or other elements of the network 10.

III. Client Description

Figure 4:
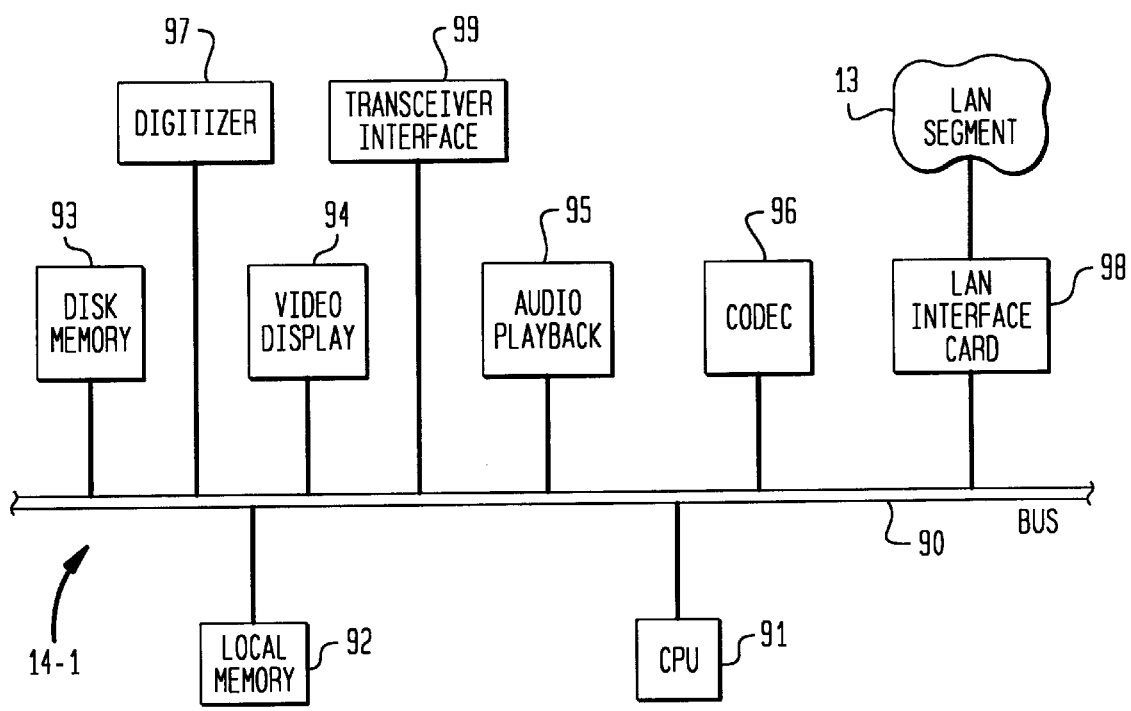
FIG. 4 schematically illustrates the hardware comprising a client connected to one of the local area network segments of FIG. 1.

The hardware contained in an exemplary client (e.g., client 14-1 of FIG. 1) is schematically illustrated in FIG. 4. In this embodiment, the client 14-1 is an IBM compatible PC. As shown in FIG. 4, the client 14-1 comprises a bus 90. A CPU 91 and a local memory 92 are connected to the bus 90. A disk memory 93 is connected to the bus 90. The client includes video display hardware 94 and audio playback hardware 95. In addition, the client includes video compressing/decompressing hardware in the form of a codec 96 for manipulating compressed video data. (Alternatively, video compression and/or decompression may be performed using software). The codec 96 may also include a digitizer. A LAN card 98 which, for example, may be an Ethernet card, connects the client to the LAN segment 13 of FIG. 1. The client 14-1 may also include a separate digitizer 97 suitable for interfacing the client to a video camera providing a live video stream. Alternatively, the digitizer 97 and codec 96 may be combined in a single unit. As another option, the client 14-1 may include a transceiver interface 99 suitable for providing a connection to a satellite network transceiver such as transceiver 20 of FIG. 1.

Figure 5A:
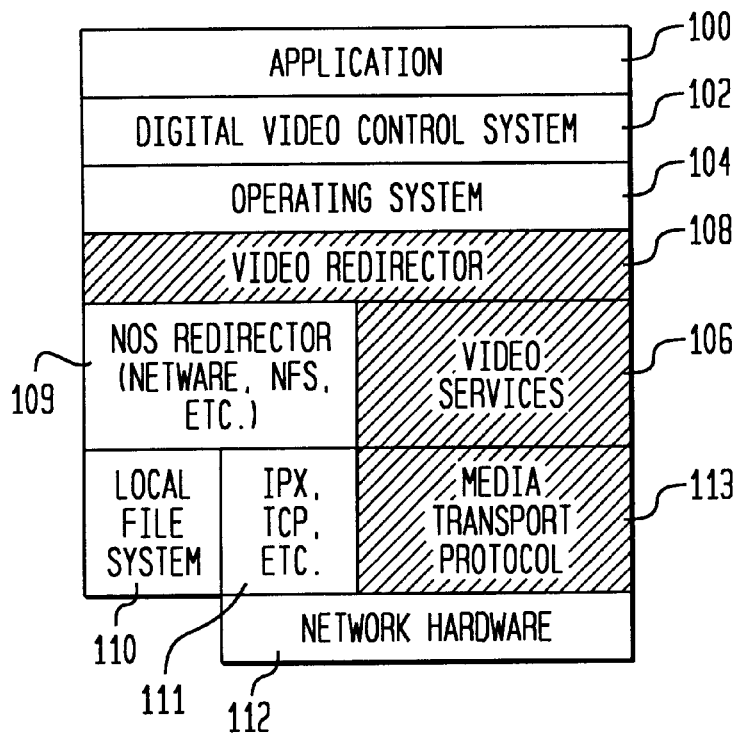
FIGS. 5A and 5B schematically illustrate software executed by the CPU in the client of FIG. 4.
Figure 5B:
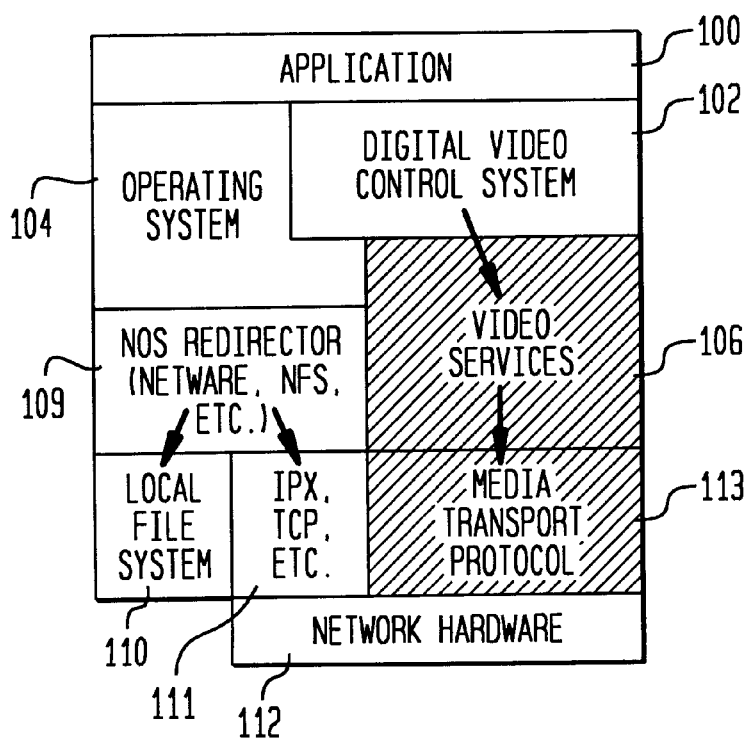

FIGS. 5A and 5B illustrate the software executed by the CPU 91 in the client 14-1 of FIG. 4. As shown in FIG. 5A the client software includes video applications and video player software 100 such as Microsoft MCI™ Media player. The digital video control system 102 manages video objects to provide a user interface to manipulate and/or view one or more movies. The digital video control system may for example be Microsoft Video for Windows™ or QuickTime™. The client software also includes an operating system 104 such as DOS or UNIX. In addition, the client executes video service interface software 106 which permits the client to access digital video from the dedicated video server 12 across the LAN segment 13 (see FIG. 1). This software provides a set of movie and stream control functions which can be called by the user. The video services interface software 106 translates the function calls into remote procedure calls. Typical video function which can be called by the video services interface software includes movie manipulation routines like open/close, play/stop/record, read/write. A typical stream function is connect/disconnect.

In FIG. 5A, the digital video control software 102 accesses the video services interface software 106 via the operating system 104. Thus, the software of FIG. 5A includes a video redirector 108. The video redirector 108 receives requests for video services and transactional data file requests from the operating system 104. The video redirector 108 separates the requests for video services from the transactional data file requests and directs the requests for video services to the video services interface software 106. The transactional data file requests are directed to a Network Operating System (NOS) redirector 109. This NOS redirector 109 directs the transactional data file requests to a local file system 110 located at the client or via a network protocol 111 and network interface hardware 112 to a data file server (not shown) which may be connected to the LAN segment 13 (see FIG. 1). The video service requests are processed by the video services interface software 106 which converts functional calls into remote procedure calls (RPCs). The RPCs are transmitted using the protocol 113 and network hardware 112 across the LAN segment 13 (see FIG. 1) to the server 12.

Thus, in FIG. 5A the client software utilizes two levels of redirection: there is a video redirector 108 and an NOS redirector 109.

In FIG. 5B an alternate form of software for using a client is illustrated. In FIG. 5B, the digital video control software 102 directly accesses the video services interface software 106. Thus, the video redirector 108 is omitted and there is only a single level of redirection in the form of the NOS redirector 109.

Clients access digital video data from the video server 12 or from another video source in the network based on the stream concept. As indicated above, a stream is based on an ordered byte sequence with the following characteristics: (i) a stream data flow has a rather high but relatively constant rate, (ii) stream data is accessed sequentially, and (iii) stream data must be delivered in a timely fashion (hence the continuity requirements). The communication between the clients and the server is as follows. A stream connection is used to deliver data for each movie track. A movie may have more than one track and hence more than one stream associated with it. To access and/or modify movie streams attributes, a client can send commands to the video server by issuing RPCs on a separate logical connection.

IV. Server-Mediated Video Presentation System

Figure 6:
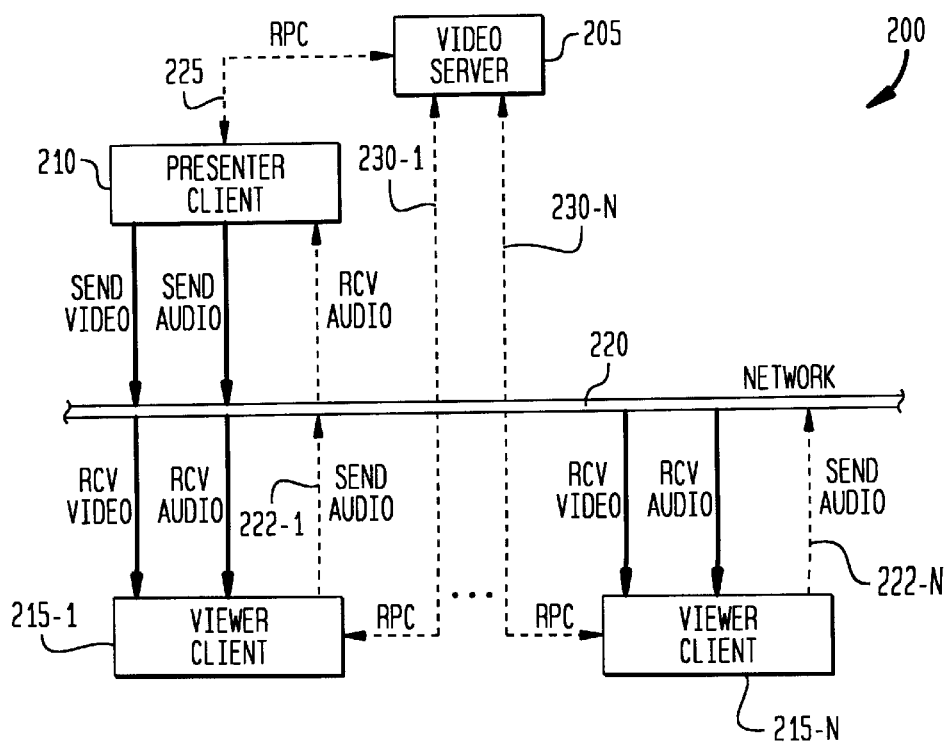
FIG. 6 is a block diagram of an exemplary video presentation system in accordance with the invention.

FIG. 6 shows an exemplary video presentation system 200 in accordance with the invention in which a live video program from one source client, referred to in this example as a presenter client, is broadcast for presentation to a number of viewer clients. System 200 includes a video server 205 which may be a dedicated video server as described above in conjunction with FIGS. 1, 2, 3 and 3A. The system 200 further includes a presenter client 210 and a number of viewer clients 215-$i$, i=1, 2 . . . N interconnected via one or more network segments, collectively designated as network 220. The network 220 may include one or more LAN segments, hub switches, transceivers, PSTNs and other network elements configured in the manner shown in FIG. 1. The presenter client 210 and the viewer clients 215-$i$ may therefore be any combination of the clients 14-$i$, 32-$i$ and 42-$i$ of FIG. 1. Each of the clients 210 and 215-$i$ may include a desktop PC configured in the manner described above in conjunction with FIGS. 4, 5A and 5B.

The presenter client 210 supplies a video stream and an audio stream to the network 220 for distribution to each of the viewer clients 215-$i$ as shown. In addition, each viewer client 215-$i$ is operative to supply an audio stream via a return channel 222-$i$ to the network 220. In alternative embodiments, each viewer client could supply a return channel video stream in addition to or in place of the return channel audio stream. The return channel audio stream is suitable for delivery to the presenter client 210 and/or to other viewer clients 215-$i$ in a manner to be described in greater detail below. The video and audio streams may be configured in accordance with well-known coding standards such as CCITT H.261, MPEG or MPEG II.

Using system 200, a live video presentation can be provided from a presenter desktop PC to the desktop PCs of each member of the audience. The system 200 also permits one or more viewers to raise and/or answer questions, make comments, or otherwise participate in the presentation from a viewer desktop PC via the audio return channels. In one embodiment, the presenter controls the access of the viewers to the audio return channels. For example, the presenter can enter commands at a terminal of presenter client 210 to designate which of the viewer clients 215-$i$ is authorized to provide an audio stream to the network 220 for delivery to the other clients 215-$i$ and the presenter client 210. The commands may be entered in response to requests for permission to speak received from the viewer clients 215-$i$.

The server 205 controls the transmission of the video and audio streams over network 220 using, for example, the RPC features described above in conjunction with FIG. 3. Communication between server 205 and the presenter client 210 is provided by establishing an RPC channel 225. Similarly, communication between server 205 and viewer clients 215-$i$ is provided by establishing RPC channels 230-$i$. The server 205 is configured such that a given client can receive an RPC from the server without the server first receiving an initiating RPC from the given client.

In this embodiment, a live video stream from presenter client 210 is continuously provided to each of the viewer clients 215-$i$. The presenter video stream represents, for example, live video depicting a particular conference participant, a conference room, a classroom, a blackboard and an instructor, a series of viewgraphs or any other presentation suitable for display at a user terminal of one or more of the viewer clients 215-$i$. Of course, the system 200 could also be configured to operate using previously-stored video. The server 205 maintains in memory a list of all viewer clients 215-$i$ currently viewing the presentation. The server memory used may be local memory 53 or disk array 54 as described previously.

The audio stream broadcast to each of the viewer clients 215-$i$ may be the audio stream provided by the presenter client 210 or a return channel audio stream provided by one or more of the viewer clients 215-$i$. As noted above, the determination as to which viewer client 215-$i$ is authorized to broadcast an audio stream is generally controlled by the presenter client 210. During a presentation, presenter client 210 initially broadcasts its audio stream to the viewer clients 215-$i$. The presenter client 210 then periodically retrieves from server 205 via RPC channel 225 a list of all viewer clients 215-$i$ currently viewing the presentation. The list contents will of course vary as viewer clients are added to or dropped from the presentation. The retrieved list will also include a request status for each of the current viewer clients 215-$i$ indicating whether or not the corresponding viewer client has requested permission to broadcast an audio stream. The list is maintained by the server 205 using information obtained via the above-noted RPC channels 230-$i$ established between server 205 and each of the viewer clients 215-$i$. A given viewer client will generally send a log-in RPC to the server 205 in order to be added to the presentation, and will send a log-off RPC when it desires to be dropped from the presentation. The server utilizes these RPCs to maintain the current viewer list.

If the presenter decides to allow a given viewer client 215-$i$ to broadcast an audio stream, the presenter will enter a command at a terminal of presenter client 210. The command will direct server 205 to cease broadcasting of the audio stream from presenter client 210 and to commence broadcasting of the audio stream from the designated viewer client 215-$i$. In this case, a suitable indication may be placed in the broadcast audio stream and utilized to notify the viewing clients that the audio stream and video stream are not coming from the same source and therefore need not be strictly synchronized. In applications dealing with interactive audio conversation, the amount of audio signal delay between sender and receiver clients is preferably minimized.

If the presenter subsequently decides to terminate the broadcasting privilege of the designated viewer client, the presenter will enter another command and server 205 will process the command such that the audio stream from presenter client 210 is broadcast in place of the audio stream from the previously designated viewer client. When either the presenter client or a given viewer client is no longer broadcasting its own audio stream, server 205 configures the system such that the presenter client or the given viewer client receives the currently broadcast audio stream from another client.

The presenter client 210 may include a menu-driven command interface in which the presenter can enter a suitable command via a point-and-click device to view the above-noted list of all viewer clients 215-i currently viewing the presentation. This command initiates an RPC to the video server 205 as previously described. A menu is then displayed to the presenter showing the viewer client list and the request status of each viewer client. The presenter authorizes a given client to speak by first selecting the corresponding client on the displayed menu using the point-and-click device via one or more pull-down display windows. The selection is conveyed to the server 205 via an RPC and an attention message is generated on the user terminal of the selected viewer client indicating that the presenter may soon authorize them to broadcast an audio stream. The presenter then executes another command such that the audio stream from the selected viewer client is broadcast. A suitable message is displayed to the user terminal of the selected viewer client to remind them that they are "On The Air" and therefore broadcasting an audio stream to the presenter client and the other viewer clients. When the presenter wants to return to broadcasting the presentation audio stream, the presenter can exit a menu display window of the viewer list. This will send a command to the server 205 to reconfigure the broadcast audio channel and remove the "On The Air" message displayed to the last authorized viewer client.

The system 200 may be configured to operate with multiple presenter clients, each capable of providing a live or previously-stored video stream to the network 160. As noted above, the return channels from the viewer clients could be readily configured to accommodate return video streams in addition to or in place of the return audio streams described previously. The server 205 then distributes the different video streams in accordance with RPC commands generated by a designated one or more of the presenter clients or viewer clients. For example, a presenter client could authorize one or more particular viewer clients to speak, and a video stream and/or an audio stream from the authorized clients could then be broadcast to the remaining clients via network 220 under the control of video server 205.

V. Multicast Directory Services

A server-mediated live video distribution network in accordance with the invention may provide multicast directory services. As noted above, a multicast refers generally to a transmission from one source client to a subset of all possible destination clients, while a broadcast refers to a transmission from one source client to all possible destination clients, and a unicast refers to a transmission from one source client to one destination client. A multicast directory generally allows viewer clients which may include clients 14-i, 32-i and 42-i in FIG. 1 to access information regarding available video programs and/or transmission channels. The multicast directory may be in the form of a list of live video programs currently available to a particular client. Such a directory is particularly useful for receive-only viewer clients such as client 28 of FIG. 1 which are connected to the network via unidirectional communication links. Of course, the multicast directory services of the present invention can be utilized with broadcasts and unicasts as well as multicasts.

A multicast directory is provided by a server reserving a predetermined multicast address for transmission of directory information. The directory information is then periodically transmitted by the server in one or more packets corresponding to the multicast address. The transmitted information may include addresses or other identifiers which specify each of the video programs and/or channels available to a particular viewer client or group of viewer clients. A given viewer client receives the directory information by "tuning" to the predetermined multicast address in a conventional manner. The viewer client can utilize the directory information to compile and display a directory list of the currently available video programs.

The transmitted directory information is updated by the server or the viewer client as programs are added to or dropped from the current group of available programs. The viewer client may update the directory list by dropping any listed programs for which the expected identification information has not been received within a predetermined time, and adding any unlisted programs for which identification information has been received. Viewer clients can select an available program or programs from a displayed directory list, and the corresponding video programs are then delivered to the viewer clients at the direction of the server in the manner previously described.

Alternatively, the directory information may be maintained in the form of a list by the server 12 and the list may be accessed by a particular viewer client 14-i, 32-i or 42-i via an RPC as described in conjunction with FIGS. 2 and 3 above. As another alternative, the directory may be assembled by a given viewer client in accordance with information periodically transmitted from various source clients instead of directly from the server. The directory information may be transmitted from the source clients in a predetermined multicast address or other addressable channel location within a given transmitted data stream. Each viewer client can then receive the directory information directly from each source client and independently configure a list of video programs available to that client.

Finally, the above-described embodiments of the invention are intended to be illustrative only. Numerous alternative embodiments may be devised by those skilled in the art without departing from the scope of the following claims.

We claim:

1. A network for providing server-mediated live video applications comprising:

a transmission medium;

a video server connected to the transmission medium; and a plurality of clients connected to the transmission medium, said clients transmitting requests to said server for enabling live full motion video streams to be transmitted in said network, said server, in response to requests received from said clients, being capable of enabling multiple simultaneous full motion video streams, comprising stream attributes, to be transmittable in said network by admitting said streams based on available network resources, and said server modifying said stream attributes in response to said requests transmitted by said clients, and said video streams being transmittable from one client to another client, from one client to multiple other clients and from one client to said server for storage.

2. The network of claim 1 wherein said server also enables the transmission of stored video streams from said server to one or more of said clients.

3. The network of claim 1 wherein said server enables the transmission of a multicast wherein a live full motion video stream is transmitted from one source client to a plurality of viewer clients.

4. The network of claim 1 wherein one of said clients is connected to a storage device which serves as a source or a destination for a video stream.

5. The network of claim 1 wherein one of said clients is connected to a satellite transceiver.

6. An apparatus for directing distribution of a video stream in a network including a shared transmission medium, at least one source client connected to the network and at least one viewer client connected to the network, the apparatus comprising:

a video server connected to the network and operative to control transmission of a live video stream, having stream attributes, from said source client via said transmission medium to said viewer client based on available network resources, said video server being responsive to a command from said source client or said viewer client to thereby enable the transmission of the live video stream, and modifying said stream attributes in response to requests transmitted by said clients.

7. The apparatus of claim 6 wherein the command is provided via a remote procedure call channel established over the medium between the server and the viewer client or the source client.

8. The apparatus of claim 6 wherein the video stream is one of a plurality of live video streams selectable by the viewer client.

9. The apparatus of claim 6 wherein said server further enables the transmission of stored video streams from said server to one or more of said clients.

10. The apparatus of claim 6 wherein said server further enables the transmission of a multicast wherein a live full motion video stream is transmitted from one source client to a plurality of viewer clients.

11. An apparatus for directing transmission of a video stream in a network including a shared transmission medium, at least one source client connected to the medium and a plurality of viewer clients connected to the medium, the apparatus comprising:

a video server connected to the transmission medium and operative to control transmission of a video stream, having stream attributes, from said source client to at least one of said viewer clients based on available network resources, said video server receiving a request from one of said viewer clients for authorization to broadcast over said medium, said video server modifying said stream attributes in response to said requests transmitted by said clients; and said video server providing an indication to the source client that said one of said viewer clients has transmitted said request for authorization.

12. The apparatus of claim 11 wherein the request for authorization corresponds to a remote procedure call between the server and said one of said viewer clients.

13. The apparatus of claim 11 wherein the indication provided by the server to the source client corresponds to a remote procedure call between the server and the source client.

14. The apparatus of claim 11 wherein the video stream is a live video stream provided by the source client and continuously broadcast at the direction of the server to each of the plurality of viewer clients.

15. The apparatus of claim 11 wherein the source client further provides an audio stream which is broadcast at the direction of said server to each of the plurality of viewer clients until one of said viewer clients is authorized to transmit an audio stream.

16. The apparatus of claim 11 wherein the server further receives an indication from the source client that the source client has authorized one of the viewer clients to broadcast an audio stream.

17. A method for directing transmission of a video stream in a network including a shared transmission medium, a video server connected to the medium, at least one source client connected to the medium and a plurality of viewer clients connected to the medium, the method comprising the steps of:

providing a video stream having stream attributes from the source client to at least one of said plurality of viewer clients at the direction of the video server;

admitting, by said video server, said video stream based on available network resources modifying, by said video server, said stream attributes in response to a request transmitted by said at least one source client; and controlling in the video server access of one or more of the viewer clients to a transmission channel of the medium.

18. The method of claim 17 wherein the step of controlling access of one or more of the viewer clients to a channel in the medium further includes the steps of:

receiving in the video server a request from at least one of said plurality of viewer clients for authorization to broadcast an audio stream over an audio transmission channel of the medium; and processing the request to determine if said one of said viewer clients is authorized to broadcast the audio stream over said medium.

19. The method of claim 18 wherein the step of processing the request further includes the step of providing an indication to the source client that said one of said viewer clients has transmitted said request.

20. The method of claim 19 wherein the step of providing an indication to the source client that said one of said viewer clients has transmitted said request further includes providing a remote procedure call from said server to said source client.

21. The method of claim 18 wherein the step of processing the request further includes the steps of:

receiving an authorization command from the source client indicating that the source client has authorized at least one of the viewer clients to broadcast an audio stream; and directing the broadcast of the audio stream from the authorized one of the viewer clients over the medium to the source client and others of the plurality of viewer clients.

22. The method of claim 18 wherein the step of receiving a request from one of said viewer clients for authorization to broadcast an audio stream over said medium includes receiving a remote procedure call in said server from said one of said viewer clients.

23. The method of claim 17 wherein the source client broadcasts an audio stream to said plurality of viewer clients until one of said viewer clients is authorized to broadcast an audio stream.

* * * * *